(12) United States Patent
Pogorelik et al.

(10) Patent No.: US 10,819,780 B2
(45) Date of Patent: Oct. 27, 2020

(54) PROTECTED DATA COLLECTION IN A MULTI-NODE NETWORK

(71) Applicant: McAfee, LLC, San Jose, CA (US)

(72) Inventors: Oleg Pogorelik, Lapid (IL); Alex Nayshtut, Gan Yavne (IL); Ned M. Smith, Beaverton, OR (US); Igor Muttik, Berkhamsted (GB); Michael Raziel, Jerusalem (IL)

(73) Assignee: McAfee, LLC, San Jose, CA (US)

( * ) Notice: Subject to any disclaimer, the term of this patent is extended or adjusted under 35 U.S.C. 154(b) by 67 days.

(21) Appl. No.: 14/998,159

(22) Filed: Dec. 24, 2015

(65) Prior Publication Data

US 2017/0187799 A1 Jun. 29, 2017

(51) Int. Cl.
H04L 29/08 (2006.01)
H04L 29/06 (2006.01)

(52) U.S. Cl.
CPC ...... *H04L 67/1076* (2013.01); *H04L 65/4076* (2013.01)

(58) Field of Classification Search
CPC .................. H04L 67/1076; H04L 65/4076
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,295,527 B1* | 9/2001 | McCormack | ....... H04L 41/0213 |
| 6,460,050 B1 | 10/2002 | Pace et al. | |
| 7,506,155 B1 | 3/2009 | Stewart et al. | |
| 2003/0080997 A1 | 5/2003 | Fuehren et al. | |
| 2003/0131129 A1* | 7/2003 | Becker | .................. H04L 67/104 709/238 |
| 2004/0181575 A1* | 9/2004 | Mallberg | ............ H04L 67/1076 709/203 |
| 2008/0222235 A1* | 9/2008 | Hurst | ...................... H04L 67/42 709/201 |
| 2010/0211789 A1* | 8/2010 | Dolganow | .......... H04L 63/0227 713/171 |
| 2012/0063323 A1* | 3/2012 | Mortier | ................... H04L 41/12 370/241 |
| 2013/0104221 A1 | 4/2013 | Low et al. | |

(Continued)

FOREIGN PATENT DOCUMENTS

WO 2015099697 A1 7/2015

OTHER PUBLICATIONS

International Search Report and Written Opinion in International Application No. PCT/US2016/063435, dated Mar. 2, 2017, 11 pages.

*Primary Examiner* — Charles C Jiang
*Assistant Examiner* — Voster Preval
(74) *Attorney, Agent, or Firm* — Patent Capital Group (57) ABSTRACT

Particular embodiments described herein provide for an electronic device that can be configured to receive a broadcast query from a network element, receive information from a plurality of devices, process the information, and generate an integrated group response, wherein the integrated group response summarizes the information about the plurality of devices and removes identification information that could allow data to be linked to a specific device from the plurality of devices. The integrated group response can be communicated back to the network element in response to the query.

15 Claims, 9 Drawing Sheets

(56) References Cited

U.S. PATENT DOCUMENTS

| | | | |
|---|---|---|---|
| 2014/0348061 A1* | 11/2014 | Salkintzis | H04W 4/80 370/328 |
| 2015/0067819 A1* | 3/2015 | Shribman | H04L 67/06 726/12 |
| 2015/0088884 A1* | 3/2015 | Shah | G06Q 10/10 707/737 |
| 2016/0027054 A1* | 1/2016 | Leppanen | H04L 51/16 705/14.57 |
| 2016/0094640 A1* | 3/2016 | Baldwin | G06Q 40/04 709/206 |
| 2017/0006115 A1* | 1/2017 | Chen | H04L 67/16 |
| 2017/0032589 A1* | 2/2017 | Zagajac | H04L 67/1097 |
| 2017/0048646 A1* | 2/2017 | Foti | H04W 4/005 |
| 2017/0126764 A1* | 5/2017 | Thramann | G06F 16/435 |
| 2017/0180480 A1* | 6/2017 | Yang | H04L 67/12 |
| 2018/0279090 A1* | 9/2018 | Hirata | H04W 4/06 |

* cited by examiner

| 128 | 130 | 132 | 134 | 136 | 138 |
|---|---|---|---|---|---|
| QUERY IDENTIFICATION | RESPONSE TIME OUT | GROUP FILTER | QUERY | TOKEN VERSION | RESPONSE |
| 123ABC | 120 SECONDS | MALE | AGE | 42.42 | 24 |

| 128 | 130 | 132 | 134 | 136 | 138 |
|---|---|---|---|---|---|
| QUERY IDENTIFICATION | RESPONSE TIME OUT | GROUP FILTER | QUERY | TOKEN VERSION | RESPONSE |
| 123ABC | 120 SECONDS | MALE | AGE | 42.42 | 24 |
| | | | | 42.43 | 32 |

| 128 | 130 | 132 | 134 | 136 | 138 |
|---|---|---|---|---|---|
| QUERY IDENTIFICATION | RESPONSE TIME OUT | GROUP FILTER | QUERY | TOKEN VERSION | RESPONSE |
| 123ABC | 120 SECONDS | MALE | AGE | 42.42 | 24 |
| | | | | 42.43 | 32 |
| | | | | 42.44 | 18 |
| | | | | ○○○ | ○○○ |

PROTECTED DATA COLLECTION IN A MULTI-NODE NETWORK

TECHNICAL FIELD

This disclosure relates in general to the field of information security, and more particularly, to protected data collection in a multi-node network.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. In addition, a malicious operator that gains access to a system may be able to steal sensitive information or perform any number of other malicious actions. Hence, significant administrative challenges remain for protecting computers and computer networks from malicious and inadvertent exploitation by malicious software or malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for protected data collection in a multi-node network. Features such as structure(s), function(s), and/or characteristic(s), for example, are described with reference to one embodiment as a matter of convenience; various embodiments may be implemented with any suitable one or more of the described features.

Figure 1:
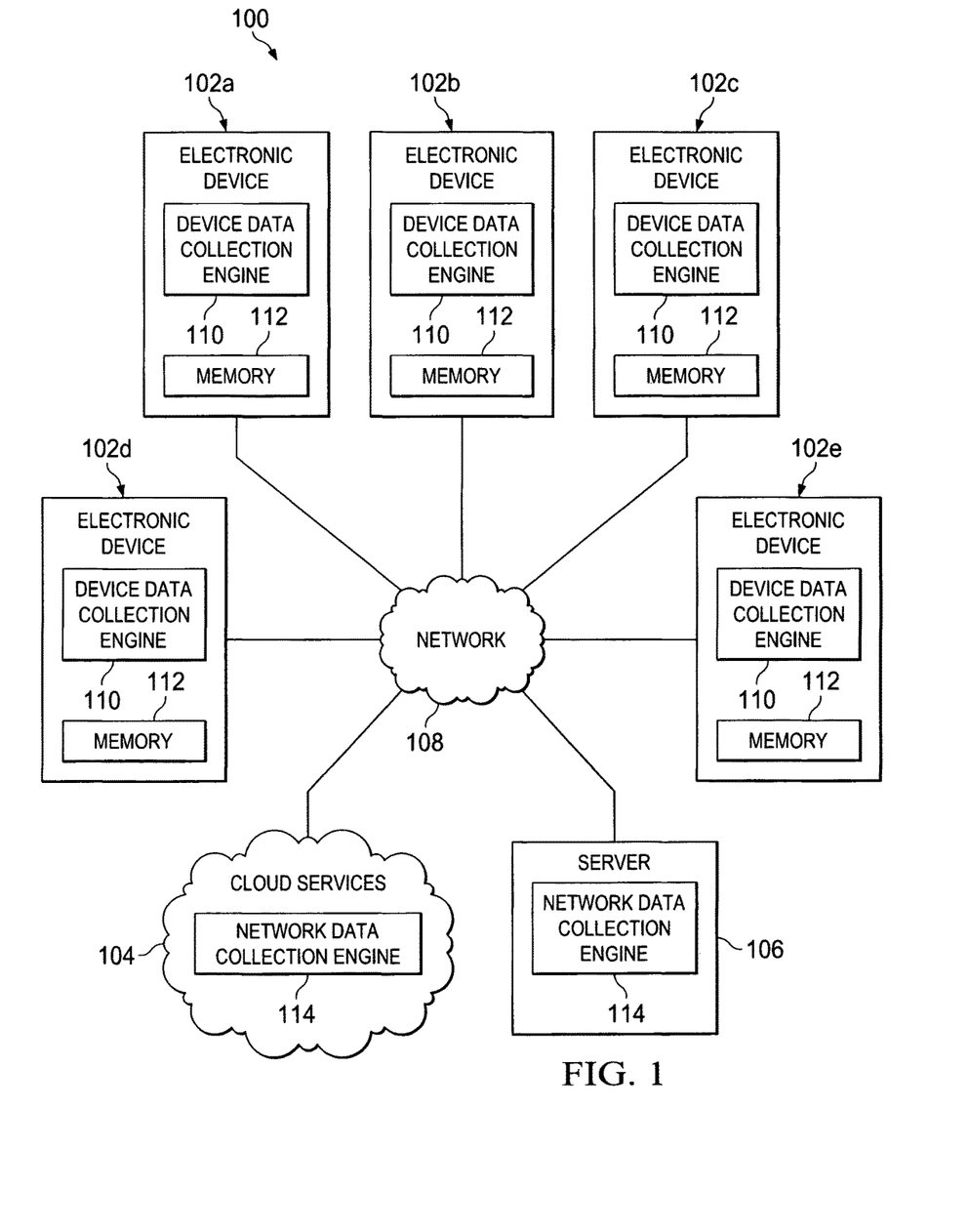
FIG. 1 is a simplified block diagram of a communication system for protected data collection in a multi-node network in accordance with an embodiment of the present disclosure.

FIG. 1 is a simplified block diagram of a communication system 100 for protected data collection in a multi-node network in accordance with an embodiment of the present disclosure. Communication system 100 can include one or more electronic devices 102*a*-102*e*, cloud services 104, and a server 106. Electronic devices 102*a*-102*e*, cloud services 104, and server 106 can communicate with each other using network 108. Each electronic device 102*a*-102*e* can include a device data collection engine 110 and memory 112. Each of cloud services 104 and server 106 can include a network data collection engine 114.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In an example, communication system 100 can be configured to include a system that allows for protected data collection in a multi-node network. In an example, each of device data collection engine 110 and network data collection engine 114 can be any combination of hardware, software, or firmware that is configured to carry out or perform the operations, activities, or functions outlined herein. In an illustrative example, device data collection engine 110 and network data collection engine 114 can be configured to receive a broadcasted query or a request sent to a group of responders (e.g., electronic devices 102*a*-102*e*). In response to the query or request, an integrated group response (IGR) can be returned to the requestor summarizing information about all group members but excluding IDs and other technical details which could allow linking data to specific responders.

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is expanding automation where smart systems replace humans in daily operations. In many cases these systems are designed to collect and process information about an object (either human or material item) in order to make or execute decisions. Collected information about a user is typically stored in databases linked to one or more of the user's identities (e.g. boarding number, phone number, MAC address, passport number, etc.). Unfortunately, a compromise of this database constitutes a major privacy and/or security risk and can be misused in many different ways. For example, data can be sold, used for intelligence or competitive purposes, used to mount other stages of attack, or perform any number of other malicious actions.

Current solutions, such as random identities, improve the situation only a little as they still allow user tracking and correlation (e.g., MAC address sniffing). Also, these solutions do not provide anonymity in cases when the session latency or IP allocation time slot is shorter than the lifetime of the temporary identity. What is needed is a system and method to grant full anonymity of the information collected automatically from a group of users/devices in order to work out group related decisions.

A communication system for protecting data collection in a multi-node network, as outlined in FIG. 1, can resolve these issues (and others). In communication system 100 instead of polling information from responders one by one, the information collection system (e.g., cloud services 104 or server 106) can broadcast a query or request to a group of responders (e.g., electronic devices 102a-102e) or send a single request to the first available responder from the group. In response to the request, an integrated group response (IGR) can be returned to the requestor by one of the responders summarizing information about all group members but excluding IDs and other technical details which could allow linking data to specific responders. To create the IGR, the responders can communicate in a peer-to-peer fashion with each other passing a growing information block. Each responder will only add their portion of the information to the information container that is accumulating information of the group members.

To help facilitate IGR security, the peer-to-peer communication can be done over secure communication channels and the calculations can be isolated inside a trusted execution environment (TEE). In an illustrative example, a shuttle (e.g., transport vehicle) may include three passengers and each passenger can be associated with a mobile device. At the beginning of a route, a shuttle navigator may broadcast a request "Get Optimal Route" and get back a response {Point 1; Point 2, Point 3} coming from one of the passenger's mobile devices that calculates the optimal route using information collected from the other passengers or peers. None of the passengers and driver will know what passenger is associated with what point and any private data will not be available to higher level collecting systems so the system will be less vulnerable to exploitation.

In another example, a third party can send one request and get one response while data collection and processing is performed using mesh communication and grid computing. Identities and identifiable technical information do not leave the devices associated with the users so that an unauthorized third party cannot access the identifiable data. Because calculations related to the data can be distributed, data processing can be improved over a central data processing system. In addition, better response time may be realized as a result of grid computing and mesh communication. Both the data collection system or collector (e.g., network data collection engine 114), and information nodes can communicate using special broadcast/multicast exchange based protocol and using separate channels for communicating to the data collection system and to each other.

To query information, the data collection system can broadcast a query. The query can include a query ID, used by nodes to distinguish between several concurrent queries, a group filter criteria, used by nodes to decide if the node should participate in a group response or ignore it, a response time out after the last broadcast, where if nobody else broadcasted a response before the response time out expired, the node that joined the group response will respond to the data collection system.

Information nodes can listen to the group query requests (e.g. UDP broadcast using pre-defined port) from the collection system. A node can use a group filter to determine if it is a part of the IGR (e.g. Location="In This Car" equal to connected to local hotspot). If the node is a part of the IGR, the node can create an initial group response and broadcast it over a Node-to-Node P2P communication channel (make it visible to peer Nodes). To enable detection of the changes in the IGR before sending, the broadcast node will modify a token version. In an example, CSMA/CD protocol, used as for solving collisions in LAN, could be re-used for preventing collisions and initiating an IGR first chain. After a node adds its information to the IGR, the node can locally save the Query ID and stop any communication related to the mentioned query. The node may still process and answer queries that have "new" yet unprocessed IDs.

A node that accepts an IGR generated by another node will handle the IGR in the same way as if it were accepted directly from the data collection system. For example, the node may update the IGR data block and broadcast the IGR over a node communication channel to make the IGR visible to other the peer nodes where the other peer nodes will treat the IGR in a similar manner. The process will continue until the last node adds its information to the IGR.

When a node detects (using the timeout specified in the query) that there are no more changes in the IGR related to the specific Query ID, the node will check if the version of the locally saved IGR is the same as in the last broadcasted IGR. If there is a match, and the generated IGR version is the same as transmitted IGR version, the node is the "last" in the chain, has the most complete IGR data block and therefor will send the answer to the data collection system using a dedicated channel. In an example, before sending the answer back, the node will generate an anonymized information summary to respond to the query (e.g., average age, route, etc.). The anonymized information summary does not include any personal information, data used in the communications between peer nodes, or any other identifiable information that could be used to identify a specific node.

To ensure data protection, all the node processing can run in a TEE that will protect data against node based attackers. Nodes P2P communication can also be done over secured channels connecting peers TEEs and using, for example, keys available only in TEEs for encrypting communication data. This allows the system to grant reliable and trustworthy operations as well as authenticity and integrity of the resulted data.

Turning to the infrastructure of FIG. 1, communication system 100 in accordance with an example embodiment is shown. Generally, communication system 100 can be implemented in any type or topology of networks. Network 108 represent a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-102e, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a-102e, cloud services 104, and server 106 can include memory elements for storing information to be used in the operations outlined herein. Each of electronic devices 102a-102e, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a-102e, cloud services 104, and server 106 may include software modules (e.g., device data collection engine 110, network data collection engine 114, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102e, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Each of electronic devices 102a-102e can be a network element and includes, for example, desktop computers, laptop computers, mobile devices, personal digital assistants, smartphones, tablets, wearables, or other similar devices. Cloud services 104 is configured to provide cloud services to electronic devices 102a-102e. Cloud services 104 may generally be defined as the use of computing resources that are delivered as a service over a network, such as the Internet. The services may be distributed and separated to provide required support for electronic devices 102a-102e and cloud services 104. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although network data collection engine 114 is represented in FIG. 1 as being located in cloud services 104 and server 106, this is for illustrative purposes only. Network data collection engine 114 could be combined or separated in any suitable configuration. Furthermore, device data collection engine 110 could be integrated with or distributed in another network accessible by one or more of electronic devices 102a-102e.

Figure 2:
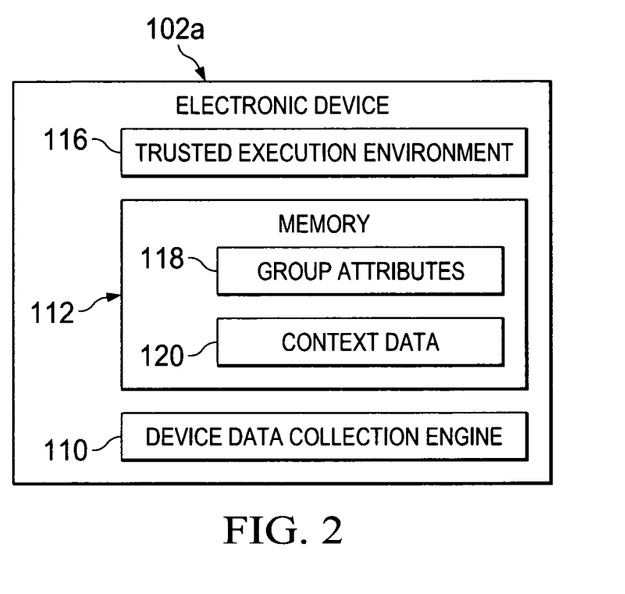
FIG. 2 is a simplified block diagram of a portion of a device for protected data collection in a multi-node network in accordance with an embodiment of the present disclosure.

Turning to FIG. 2, FIG. 2 is a simplified block diagram of a portion of communication system 100 for protected data collection in a multi-node network in accordance with an embodiment of the present disclosure. As illustrated in FIG. 2, electronic device 102a can include device data collection engine 110, memory 112, and a TEE 116. Memory 112 can include group attributes 118 and context data 120.

TEE 116 can include a protected region of memory that is typically only accessible by electronic device 102a itself or through a trusted services application program interface. Generally, other processes cannot read, write, or otherwise access the data stored in TEE 116. TEE 116 can include encrypted data and/or encryption keys that can be used to decrypt data. TEE 116 may include policies that limit the access, data, communication, etc.

Group attributes 118 can include group filter criteria for electronic device 102a and a user associated with electronic device 102a. Context data 120 can include context information that, if reviled, would make the user of electronic device easily identifiable. For example, if the user of electronic device 102a was the only male in a room full of females, then answering a query where a group attribute is being a male would allow for easy identification of the user.

Figure 3:
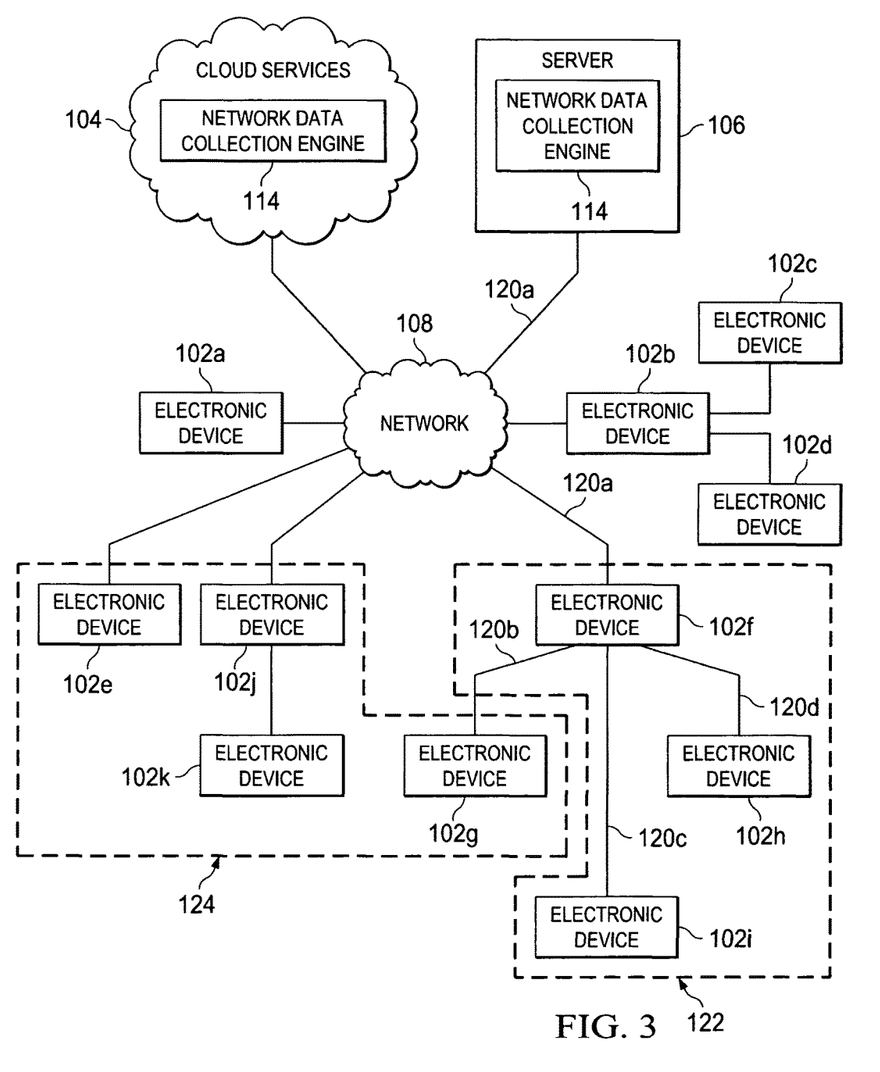
FIG. 3 is a simplified block diagram of a communication system for protected data collection in a multi-node network in accordance with an embodiment of the present disclosure.

Turning to FIG. 3, FIG. 3 is a simplified block diagram of a communication system 100a for protected data collection in a multi-node network, in accordance with an embodiment of the present disclosure. As illustrated in FIG. 3, a plurality of electronic devices 102a-102i can be in communication with each other.

In an example, cloud services 104 or server 106 can broadcast a query or request to a group of responders (e.g., electronic devices 102a-102l) or send a single request to the first available responder from the group e.g., electronic devices 102a, 102b, 102e, 102j, and 102f). In response to the request, an integrated group response (IGR) can be returned to the requestor by one of the responders summarizing information about all group members but excluding IDs and other technical details which could allow linking data to specific responders. To create the IGR, the responders can communicate in a peer-to-peer fashion with each other passing a growing information block. Each responder will only add their portion of the information to the information container that is accumulating information of the group members.

To help facilitate IGR security, the peer to peer communication can be done over secure communication channels 120a-120d and the calculations can be isolated inside a trusted execution environment (TEE). In an illustrative example, cloud services 104 may use network data collection engine 114 to collect demographic information for a certain region or area.

To query information, network data collection engine 114 can broadcast a query to electronic devices 102a-102l. The query can include a query ID, used by nodes to distinguish between several concurrent queries, a group filter criteria, used by nodes to decide if the node should participate group response or ignore it, a response time out after the last broadcast, if nobody else broadcast responses during this time last node that joined the group response will respond to query, etc. A node can use the group filter to determine if it is a part of the IGR. For example, a group filter may include only residents of the region or area. Electronic devices 102a-102d may be associated with users who are not residents of the region or area and therefore would not be part of a response to the query. Electronic devices 102e-102l may be associated with user who are residents of the region or area and therefore would be part of a response to the query. As a result, each node can create an initial group response and broadcast it over a Node-to-Node P2P communication channel (make it visible to peer Nodes). To enable detection of the changes in the IGR before sending broadcast node will modify the token version. A node that accepts an IGR generated by another node will handle the IGR in the same way as if it were accepted directly from the data collection system (e.g., network data collection engine 114). For example, the node may update the IGR data block and broadcast the IGR over a node communication channel to make the IGR visible to other peer nodes where the other peer nodes will treat the IGR in a similar manner. The process will continue until the last node adds its information to the IGR.

When a node detects (using the timeout specified in the query) that there are no more changes in the IGR related to the specific Query ID, the node will check if the version of the locally saved IGR is the same as in the last broadcasted IGR. If there is a match, and the generated IGR version is the same as transmitted IGR version, the node is the "last" in the chain, has the most complete IGR data block and therefore will send the answer to the data collection system using a dedicated channel.

As mentioned above, to ensure data protection, all the node processing can run in a TEE that will protect data against node based attackers. Nodes P2P communication also will be done over secured channels 120b-120d connecting peers TEEs and using, for example, keys available only in TEEs for encrypting communication data.

A response to the query can be sent back by electronic device 102f (or any other electronic device) over secured channel 120a. For example, in response to the query, electronic device 10f may send back a response that group A 122 responded with one answer to the query and group B 124 responded with a different answer to the query. Network data collection engine 114 would not know what electronic devices were in group A 122 or what electronic devices were in group B 124. The data collection and processing for the response to the query can be performed using mesh communication and grid computing. Identities and identifiable technical information do not leave the devices associated with the users so that unauthorized third party can't access the identifiable data. Because calculations related to the data can be distributed, data processing can be improved over a central data processing system. In addition, better response time may be realized as a result of grid computing and mesh communication.

Figure 4A:
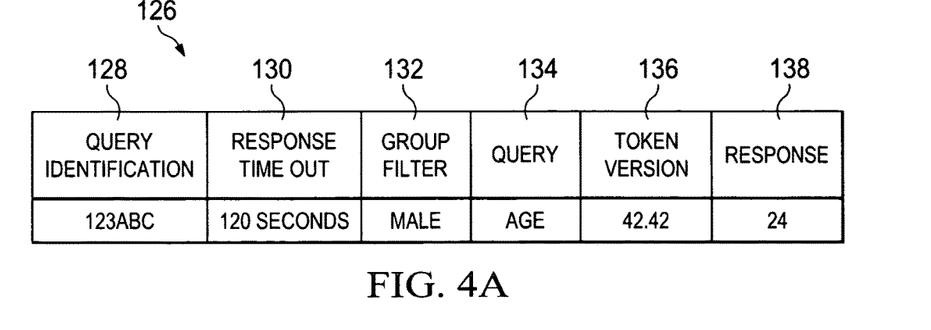
FIG. 4A is a simplified block diagram of example details for protected data collection in a multi-node network in accordance with an embodiment of the present disclosure.

Turning to FIG. 4A, FIG. 4A is a simplified block diagram of example details for protected data collection in a multi-node network in accordance with an embodiment of the present disclosure. As illustrated in FIG. 4A, an IGR 126 can include a query ID 128, a response time out 130, a group filter 132, a query 134, a token version 136, and a response 138. In an illustrative example, the query ID may be "124ABC." The response timeout may be 120 seconds or after 120 seconds from the last broadcast, if nobody else broadcast a response, the last node that joined the group response will respond. The group filter may be "male" so that only users that are male will response, and the query can be the age of the user. For example, as illustrated in FIG. 4A, one response to the query is "24." To enable detection of the changes in IGR 126, the entry in token version 136 is modified before IGR 126 is communicated to the next node. For example, electronic device 102f may have received the query, responded with the response "24," incremented token version 136 to 42.42, and communicated IGR 126 to electronic device 102h.

Figure 4B:
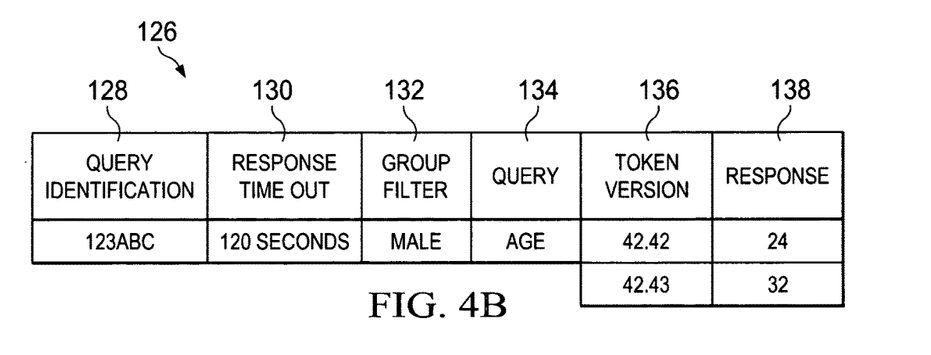
FIG. 4B is a simplified block diagram of example details for protected data collection in a multi-node network in accordance with an embodiment of the present disclosure.
Figure 4C:
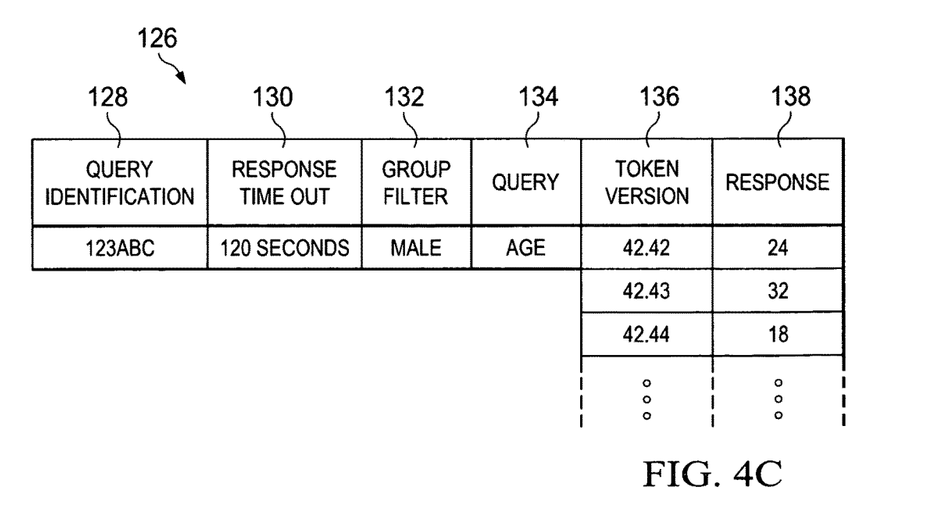
FIG. 4C is a simplified block diagram of example details for protected data collection in a multi-node network in accordance with an embodiment of the present disclosure.

Electronic device 102h may have received IGR 126 and responded with a response of "32" as illustrated in FIG. 4B. Electronic device 102h can increment token version 136 to and communicate IGR 126 to electronic device 102i. Electronic device 102i may have received IGR 126 and responded with a response of "18" as illustrated in FIG. 4C. Electronic device 102i can increment token version 136 to 42.44 and communicate IGR 126 to the next node or electronic device. After each node that satisfies the group filter has response or the response time out has been satisfied, then IGR 126 is communicated to the device that initiated the query. As illustrated in FIGS. 4A-4C, IGR 126 does not include any personal data or data that may be used to identify a user with an electronic device.

Figure 5:
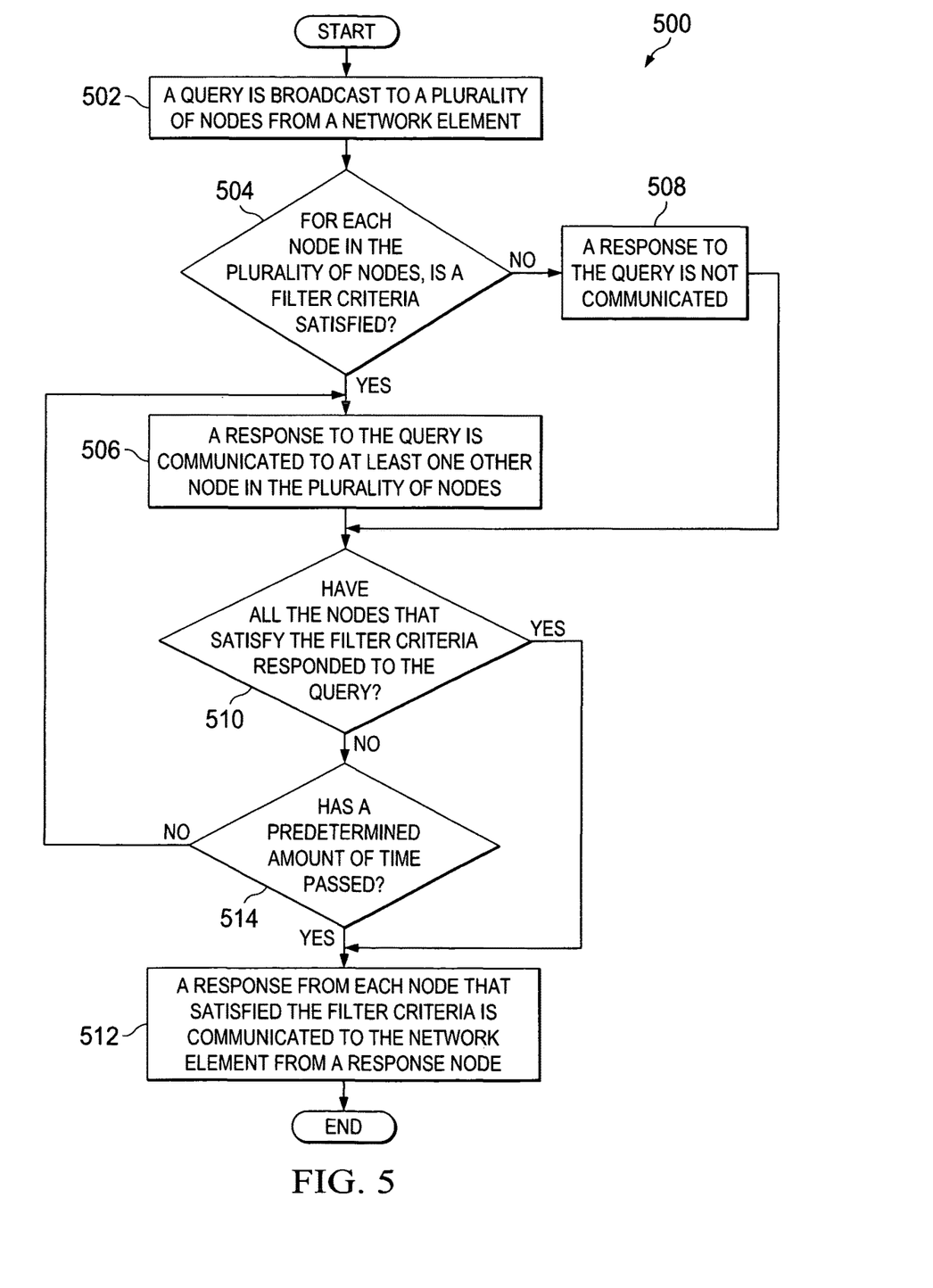
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with protected data collection in a multi-node network, in accordance with an embodiment. In an embodiment, one or more operations of flow 500 may be performed by one or more of device data collection engine 110 and network data collection engine 114. At 502, a query is broadcast to a plurality of nodes from a network element. At 504, for each node in the plurality of nodes, the system determines if a filter criteria is satisfied. If a filter criteria is not satisfied at a node, then a response to the query is not communicated by the node where the filter criteria was not satisfied, as in 508. If a filter criteria is satisfied at a node, then a response from the node that satisfied the filter criteria is communicated to at least one other node in the plurality of nodes, as in 506.

At 510, the system determines if all the nodes that satisfy the filter criteria have responded to the query. If all of the nodes that satisfy the filter criteria have responded to the query, then a response from each node that satisfied the filter criteria is communicated to the network element from a response node, as in 512. If all the nodes that satisfy the filter criteria have not responded to the query, then the system determines if a predetermined amount of time has passed, as in 514. If a predetermined amount of time has passed, then a response from each node that satisfied the filter criteria (and responded) is communicated to the network element from a response node, as in 512. In an example, before sending the response back, the node will generate an anonymized information summary to respond to the query. The anonymized information summary does not include any personal information, data used in the communications between peer nodes, or any other identifiable information that could be used by the network element to identify a specific node. If a predetermined amount of time has not passed, then a response from the node that satisfied the filter criteria is communicated to at least one other node in the plurality of nodes, as in 506.

Figure 6:
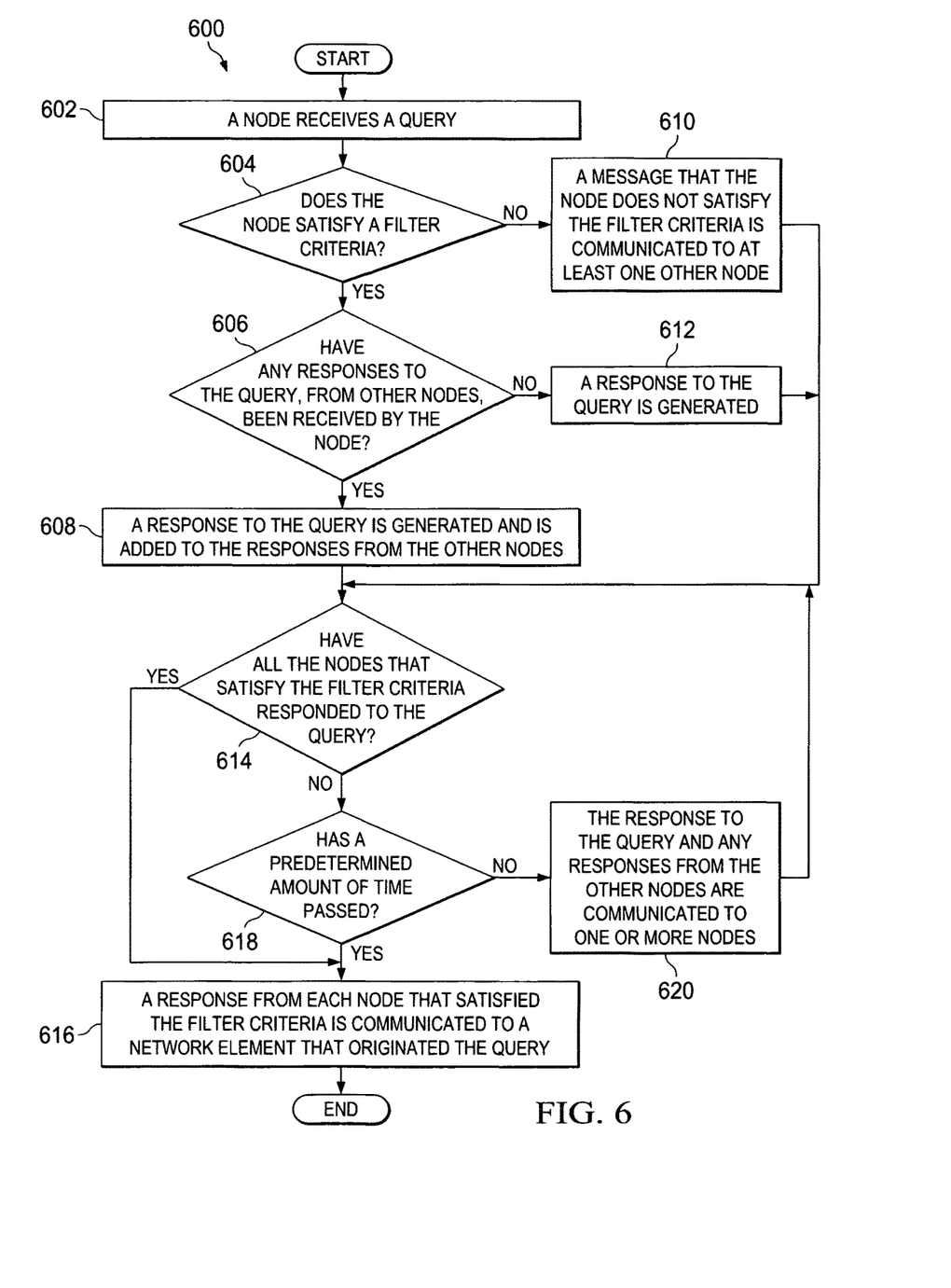
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with protected data collection in a multi-node network, in accordance with an embodiment. In an embodiment, one or more operations of flow 600 may be performed by one or more of device data collection engine 110 and network data collection engine 114. At 602, a node receives a query. At 604, the node determines the if nodes satisfies a filter criteria. If the node does not satisfy a filter criteria, then a message that the node does not satisfy the filter criteria is communicated to at least one other node, as in 610. If the nodes does satisfy the filter criteria, then the system determines if any responses to the query from other nodes has been received by the node, as in 606. If no responses to the query from other nodes have been received by the node, then a response to the query is generated, as in 612. If responses to the query have been received from other nodes, then a response to the query is generated and is added to the responses from the other nodes, as in 608.

At 614, the system determines if all the nodes that satisfy the filter criteria have responded to the query. If all the nodes that satisfy the filter criteria have responded to the query, then a response from each node that satisfied the filter criteria is communicated to a network element that originated the query, as in 616. If all the nodes that satisfy the filter criteria have not responded, then the system determines if a predetermined amount of time has passed, as in 618. If a predetermined amount of time has passes, then a response from each node that satisfied the filter criteria is communicated to a network element that originated the query, as in 616. In an example, before sending the response, the node will generate an anonymize information summary to respond to the query. The anonymized information summary does not include any personal information, data used in the communications between peer nodes, or any other identifiable information that could be used by the network element to identify a specific node. If a predetermined amount of time has not passed, then the response to the query and any responses from other nodes are communicated to one or more other nodes, as in 620. At 614, the system determines if all the nodes that satisfy the filter criteria have responded to the query.

Figure 7:
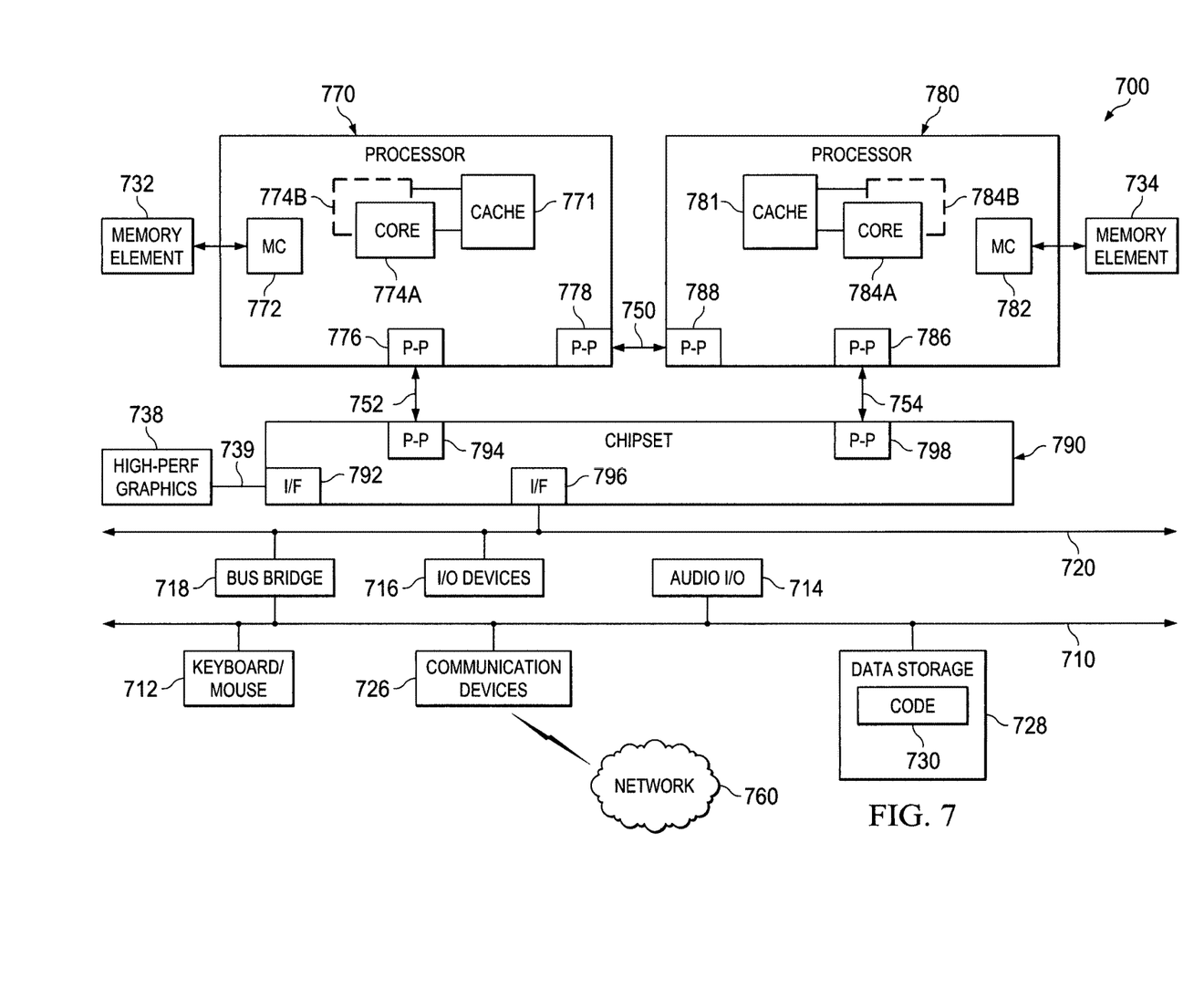
FIG. 7 is a block diagram illustrating an example computing system that is arranged in a point-to-point configuration in accordance with an embodiment.

Turning to FIG. 7, FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 100 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 4-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor, and may exchange data via a point-to-point (PtP) interface 750 using point-to-point interface circuits 778 and 788, respectively. Processors 770 and 780 may each exchange data with a control logic 790 via individual point-to-point interfaces 752 and 754 using point-to-point interface circuits 776, 786, 794, and 798. Control logic 790 may also exchange data with a high-performance graphics circuit. 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Control logic 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, internet-of-things devices, constrained devices (sensors, actuators, controllers), appliances, small wearables, health and quantified-self devices, industrial, devices, etc. It will be appreciated that these mobile devices may be provided with SoC architectures in at least some embodiments.

Figure 8:
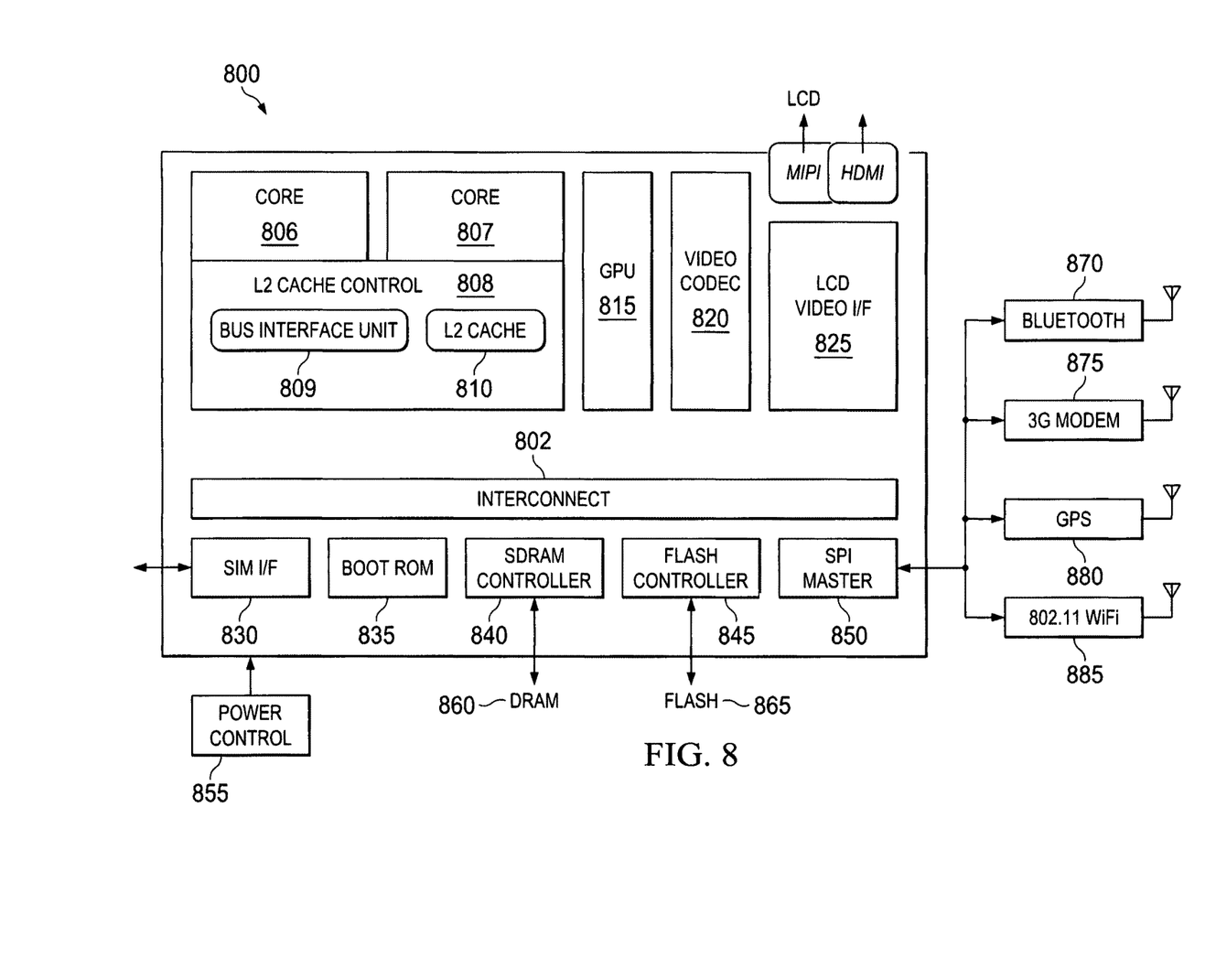
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the protected data collection features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 9:
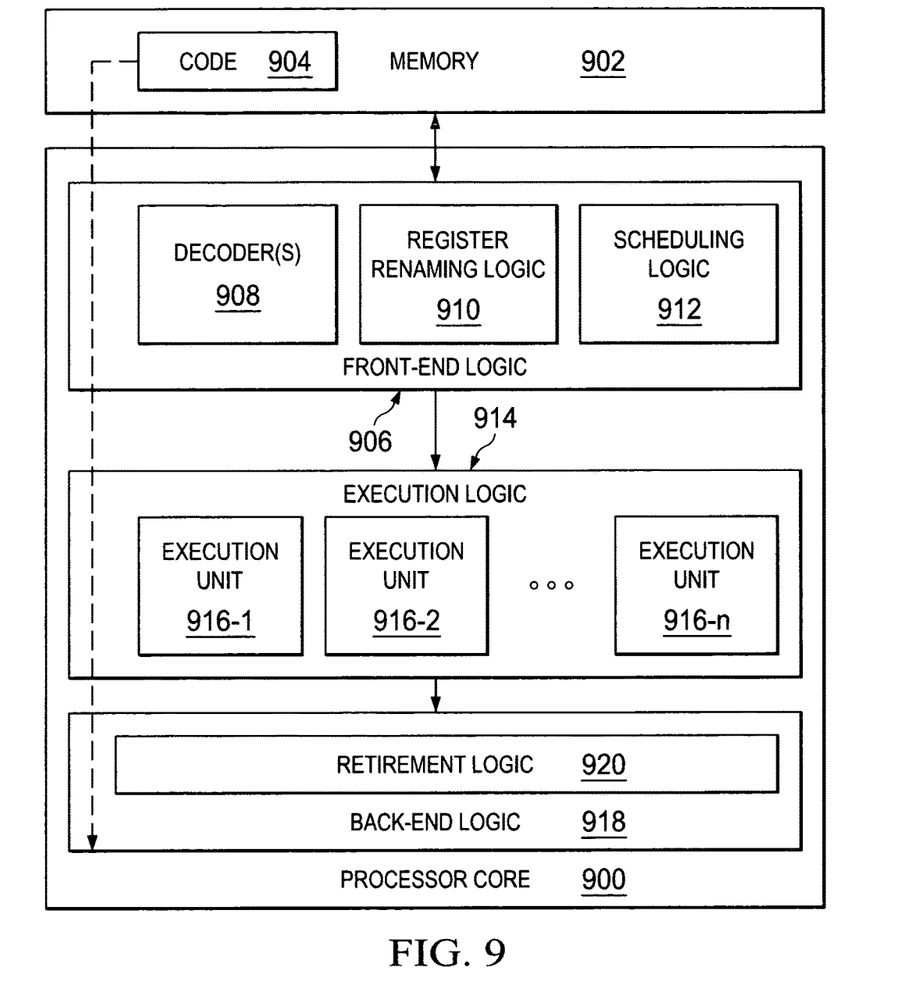
FIG. 9 is a block diagram illustrating an example processor core in accordance with an embodiment.

FIG. 9 illustrates a processor core 900 according to an embodiment. Processor core 9 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents an embodiment of processors cores 774a, 774b, 784a, and 784b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 5 and 6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to receive a broadcast query from a network element, receive information from a plurality of devices, process the information, and generate an integrated group response, wherein the integrated group response summarizes the information about the plurality of devices and removes identification information that could allow data to be linked to a specific device from the plurality of devices.

In Example C2, the subject matter of Example C1 can optionally include where the instructions, when executed by the at least one processor, further cause the at least one processor to communicate the integrated group response to the network element.

In Example C3, the subject matter of any one of Examples C1-C2 can optionally include where the plurality of devices can communicate in a peer-to-peer communication network with each device passing a growing information block.

In Example C4, the subject matter of any one of Examples C1-C3 can optionally include where the peer to peer communication network is over secure communication channels.

In Example C5, the subject matter of any one of Examples C1-C4 can optionally include where the information is processed inside a trusted execution environment.

In Example C6, the subject matter of any one of Examples C1-C5 can optionally include where each of the plurality of devices satisfies a group filter included in the broadcast query.

In Example C7, the subject matter of any one of Example C1-C6 can optionally include where the query includes a response time out, wherein the response time out includes a predetermined amount of time and after the predetermined amount of time, the integrated group response is communicated to the network element.

In Example A1, an apparatus can include a device data collection engine, where the device data collection engine is configured to receive a broadcast query from a network element, receive information from a plurality of devices, process the information, and generate an integrated group response, wherein the integrated group response summarizes the information about the plurality of devices and removes identification information that could allow data to be linked to a specific device from the plurality of devices.

In Example, A2, the subject matter of Example A1 can optionally include where the device data collection engine is further configured to communicate the integrated group response to the network element.

In Example A3, the subject matter of any one of Examples A1-A2 can optionally include where the plurality of devices can communicate in a peer-to-peer communication network with each device passing a growing information block.

In Example A4, the subject matter of any one of Examples A1-A3 can optionally include where the peer to peer communication network is over secure communication channels.

In Example A5, the subject matter of any one of Examples A1-A4 can optionally include where wherein the information is processed inside a trusted execution environment.

In Example A6, the subject matter of any one of Examples A1-A5 can optionally include where each of the plurality of devices satisfies a group filter included in the broadcast query.

In Example A7, the subject matter of any one of Examples A1-A6 can optionally include where the query includes a response time out, wherein the response time out includes a predetermined amount of time and after the predetermined amount of time, the integrated group response is communicated to the network element.

Example M1 is a method including receiving a broadcast query from a network element, receiving information from a plurality of devices, processing the information, and generating an integrated group response, wherein the integrated group response summarizes the information about the plurality of devices and removes identification information that could allow data to be linked to a specific device from the plurality of devices.

In Example M2, the subject matter of Example M1 can optionally include communicating the integrated group response to the network element.

In Example M3, the subject matter of any one of the Examples M1-M2 can optionally include where the plurality of devices can communicate in a peer-to-peer communication network with each device passing a growing information block.

In Example M4, the subject matter of any one of the Examples M1-M3 can optionally include where the peer to peer communication network is over secure communication channels.

In Example M5, the subject matter of any one of the Examples M1-M4 can optionally include where the information is processed inside a trusted execution environment.

In Example M6, the subject matter of any one of the Examples M1-M5 can optionally include where each of the plurality of devices satisfies a group filter included in the broadcast query.

In Example AA1, an apparatus can include means for receiving a broadcast query from a network element, means for receiving information from a plurality of devices, means for processing the information, and means for generating an integrated group response, wherein the integrated group response summarizes the information about the plurality of devices and removes identification information that could allow data to be linked to a specific device from the plurality of devices.

In Example, AA2, the subject matter of Example AA1 can optionally include means for communicating the integrated group response to the network element.

In Example AA3, the subject matter of any one of Examples AA1-AA2 can optionally include where the plurality of devices can communicate in a peer-to-peer communication network with each device passing a growing information block.

In Example AA4, the subject matter of any one of Examples AA1-AA3 can optionally include where the peer to peer communication network is over secure communication channels.

In Example AA5, the subject matter of any one of Examples AA1-AA4 can optionally include where wherein the information is processed inside a trusted execution environment.

In Example AA6, the subject matter of any one of Examples AA1-AA5 can optionally include where each of the plurality of devices satisfies a group filter included in the broadcast query.

In Example AA7, the subject matter of any one of Examples AA1-AA6 can optionally include where the query includes a response time out, wherein the response time out includes a predetermined amount of time and after the predetermined amount of time, the integrated group response is communicated to the network element.

Example S1 is a system for protecting data collection in a multi-node network, the system including a device data collection engine, where the a device data collection engine is configured to receive a broadcast query from a network element, receive information from a plurality of devices, process the information, and generate an integrated group response, wherein the integrated group response summarizes the information about the plurality of devices and removes identification information that could allow data to be linked to a specific device from the plurality of devices.

In Example S2, the subject matter of Example S1 can optionally include where the device data collection engine is further configured to communicate the integrated group response to the network element.

In Example S3, the subject matter of any of the Examples S1-S2 can optionally include where the plurality of devices can communicate in a peer-to-peer communication network with each device passing a growing information block.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
   receive a broadcast query from a network element, wherein the broadcast query includes a query identification, a response time out, and a group filter, wherein the broadcast query is broadcasted to a plurality of devices, and wherein the plurality of devices includes a responding device;
   receive, by the responding device, information in response to the broadcast query, wherein the information is received from the plurality of devices that meet the group filter criteria and within the response time;
   process, by the responding device, the information;
   generate, by the responding device, an integrated group response, wherein the integrated group response includes the information received in response to the broadcast query from the plurality of devices and does not include a device ID specific to a device of the plurality of devices; and communicate, by the responding device, the integrated group response to the network element.

2. The at least one non-transitory machine readable medium of claim 1, wherein the plurality of devices can communicate in a peer-to-peer communication network with an individual device of the plurality of devices passing a growing information block, wherein information from the individual device in response to the broadcast query is added to the growing information block, and wherein the information received by the responding device is the growing information block.

3. The at least one non-transitory machine readable medium of claim 2, wherein the peer to peer communication network is over secure communication channels.

4. The at least one non-transitory machine readable medium of claim 1, wherein the information is processed inside a trusted execution environment.

5. The at least one non-transitory computer-readable medium of claim 1, wherein the response time out includes a predetermined amount of time, and wherein, after the predetermined amount of time, the responding device communicates the integrated group response to the network element.

6. An apparatus comprising:
a processor; and
a memory storing executable instructions that when executed by the processor cause the processor to:
receive a broadcast query from a network element, wherein the broadcast query includes a query identification, a response time out, and a group filter, wherein the broadcast query is broadcasted to a plurality of devices, and wherein the plurality of devices includes a responding device;
receive, by the responding device, information in response to the broadcast query, wherein the information is received from the plurality of devices that meet the group filter criteria and within the response time;
process, by the responding device, the information;
generate, by the responding device, an integrated group response, wherein the integrated group response includes the information received in response to the broadcast query from the plurality of devices that meet the group filter criteria and within the response time and does not include a device ID specific to a device of the plurality of devices; and
communicate, by the responding device, the integrated group response to the network element.

7. The apparatus of claim 6, wherein the plurality of devices can communicate in a peer-to-peer communication network with an individual device of the plurality of devices passing a growing information block, wherein information from the individual device in response to the broadcast query is added to the growing information block, and wherein the information received by the responding device is the growing information block.

8. The apparatus of claim 7, wherein the peer to peer communication network is over secure communication channels.

9. The apparatus of claim 6, wherein the information is processed inside a trusted execution environment.

10. The apparatus of claim 6, wherein the query includes a response time out, wherein the response time out includes a predetermined amount of time, and wherein, after the predetermined amount of time, the responding device communicates the integrated group response to the network element.

11. A method comprising:
receiving a broadcast query from a network element, wherein the broadcast query includes a query identification, a response time out, and a group filter, wherein the broadcast query is broadcasted to a plurality of devices, and wherein the plurality of devices includes a responding device;
receiving, by the responding device, information in response to the broadcast query, wherein the information is received from the plurality of devices that satisfy the group filter criteria and within the response time;
processing, by the responding device, the information;
generating, by the responding device, an integrated group response, wherein the integrated group response includes the information received in response to the broadcast query from the plurality of devices that satisfy the group filter criteria and within the response time and does not include a device ID specific to a device of the plurality of devices; and
communicating, by the responding device, the integrated group response to the network element.

12. The method of claim 11, wherein the plurality of devices can communicate in a peer-to-peer communication network with an individual device of the plurality of devices passing a growing information block, wherein information from the individual device in response to the broadcast query is added to the growing information block, and wherein the information received by the responding device is the growing information block.

13. The method of claim 12, wherein the peer to peer communication network is over secure communication channels.

14. The method of claim 11, wherein the information is processed inside a trusted execution environment.

15. The method of claim 11, wherein the response time out includes a predetermined amount of time, and wherein, after the predetermined amount of time, the responding device communicates the integrated group response to the network element.

* * * * *

UNITED STATES PATENT AND TRADEMARK OFFICE
CERTIFICATE OF CORRECTION

PATENT NO. : 10,819,780 B2
APPLICATION NO. : 14/998159
DATED : October 27, 2020
INVENTOR(S) : Oleg Pogorelik et al.

It is certified that error appears in the above-identified patent and that said Letters Patent is hereby corrected as shown below:

In the Claims

In Column 17, Line 13, in Claim 3, delete "peer to peer" and insert -- peer-to-peer --, therefor.

In Column 17, Line 18, in Claim 5, delete "computer-readable" and insert -- machine readable --, therefor.

In Column 18, Line 3, in Claim 8, delete "peer to peer" and insert -- peer-to-peer --, therefor.

In Column 18, Line 43, in Claim 13, delete "peer to peer" and insert -- peer-to-peer --, therefor.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*